United States Patent [19]

Hara et al.

[11] Patent Number: 4,891,418

[45] Date of Patent: Jan. 2, 1990

[54] CHOLESTERIC LIQUID CRYSTAL POLYESTER

[75] Inventors: Hajime Hara, Fujisawa; Tomohiro Toya; Shigeki Iida, both of Yokohama; Tetsuo Satoh, Tokyo, all of Japan

[73] Assignee: Nippon Oil Company, Ltd., Tokyo, Japan

[21] Appl. No.: 240,952

[22] Filed: Sep. 6, 1988

[30] Foreign Application Priority Data

Sep. 7, 1987 [JP] Japan .................. 62-222073
Sep. 30, 1987 [JP] Japan .................. 62-243696

[51] Int. Cl.$^4$ .................................................. C08G 63/02
[52] U.S. Cl. .................................. 528/195; 528/176; 528/190; 528/193
[58] Field of Search ............... 528/176, 190, 193, 195

[56] References Cited

U.S. PATENT DOCUMENTS 4,652,626 3/1987 Orii ........................................ 528/195

Primary Examiner—Harold D. Anderson
Assistant Examiner—T. Mosley
Attorney, Agent, or Firm—Scully, Scott, Murphy & Presser

[57] ABSTRACT

A cholesteric liquid crystal polyester comprising the following structural units (A), (B) and (C):

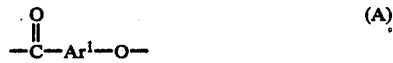

(A)

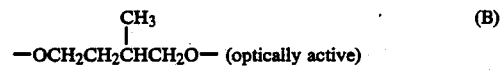

(B)

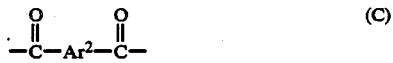

(C)

wherein $Ar^1$ and $Ar^2$ represent each independently a divalent aromatic hydrocarbon group having 6 to 20 carbon atoms, of which one or more hydrogen atoms may be substituted by one or more halogen atoms, alkyl or alkoxy groups having 1 to 4 carbon atoms, provided that at least 60 mol % of $Ar^1$ in the polymer is constituted by at least one group selected from 1,4-phenyl group, 2,6-naphthyl group and 4,4'-biphenyl group.

8 Claims, No Drawings

CHOLESTERIC LIQUID CRYSTAL POLYESTER

BACKGROUND OF THE INVENTION

The present invention relates to novel aromatic polyesters capable of being subjected to melt-processing, having high strength and high modulus properties and exhibiting reduced anisotropy when formed into films or sheets.

Recently there has been increasing demand for materials which exhibit high modulus and superior resistance to heat and to chemicals when formed into any of fibers, films and shaped articles. Although conventional polyesters are in use for various shaped articles, many of them are interior in mechanical properties such as flexural modulus and so they have heretofore been unsuitable for uses requiring such high strength and high modulus properties. As a method for improving such mechanical properties, it has been known to incorporate fillers or reinforcing materials, e.g. calcium carbonate or glass fibers, into conventional polyesters. However, such conventional method causes problems in practical use, for example, the blended fillers or reinforcing materials would spoil the light weight characteristic, which is a feature of plastics, because of increasing specific gravity of the resulting blend, and molding machines would be subjected to heavy wear during molding operations.

Liquid crystal polyesters have come to be noted recently as melt-processable polymers suitable for uses requiring high strength and high modulus properties without fillers or reinforcing materials. Special attention has been paid to such liquid crystal polyesters since W.J. Jackson made public thermoplastic liquid crystal polyesters comprising polyethylene terephthalate and hydroxybenzoic acid in U.S. Pat. No. 3,804,805 and Journal of Polymer Science Polymer Chemistry Edition, Vol.14, page 2043 (1976). Since then, various liquid crystal polyesters have been developed and studied with a view to attaining both improvement of mechanical properties, and melt-processability. However, these liquid crystal polymers have been unsuitable for such uses as films and sheets because their films or sheets exhibit a marked anisotropy in their mechanical properties due to orientation of the polymer molecules parallel to the flow direction in the melt.

As means for eliminating such anisotropy, the use of a cholesteric liquid crystal polymer has been proposed by W.R. Krigbaum et al (see U.S. Pat. No. 4,412,059). In this patent, however, although liquid crystal polyesters are noted, no description is found as to whether the said polyesters exhibit cholesteric liquid crystalline mesophase or not. Further, as will be described later, in order to obtain a film or sheet having high strength and high modulus properties, and reduced anisotropy, several specific characteristics must be required for the cholesteric liquid crystal polymers. But it is quite unknown whether the polyesters mentioned by Krigbaum have such characteristics or not. Moreover, there are not disclosed optically active diols as an optically active component in the above U.S. patent.

For obtaining a high strength and high modulus film or sheet with reduced anisotropy by melt-processing, a cholesteric liquid crystal polymer must satisfy several important requirements, which are as follows.

(1) The said polymer should have high strength and high modulus properties in fibers when it is processed in a nematic state.

(2) The cholesteric liquid crystal should take a laminar structure in which polymer molecules lie parallel to the film or sheet surface (the cholesteric helical axes are Grandjean planar textures perpendicular to the surface).

The above requirements are not referred to at all in the foregoing U.S. Pat. No. 4,412,059 in connection with the thermotropic liquid crystal polyesters disclosed therein. Therefore, it has been keenly desired to develop a cholesteric liquid crystal polyester capable of satisfying the aforementioned requirements to obtain a high strength and high modulus film or sheet with reduced anisotropy.

SUMMARY OF THE INVENTION

The present invention provides liquid crystal polyesters capable of being subjected to melt-processing and suitable for obtaining a high strength and high modulus film or sheet with reduced anisotropy.

The liquid crystal polyesters of the present invention exhibit superior mechanical properties as a fiber when they are processed in a nematic state, and they have a peculiar characteristic in that a laminar structure of cholesteric liquid crystal mesophase is easily arranged in parallel with the film or sheet surface. They comprise structural units represented by the following formulae (A), (B), (C) and optionally (D):

(A)

(B)

(C)

(D)

wherein $Ar^1$, $Ar^2$ and $Ar^3$ represent each independently a divalent aromatic hydrocarbon group having 6 to 20 carbon atoms, of which one or more hydrogen atoms may be substituted by one or more halogen atoms, alkyl or alkoxy groups having 1 to 4 carbon atoms, provided that at least 60 mol % of $Ar^1$ in the polymer is constituted by at least one group selected from 1,4-phenylene group, 2,6-naphthyl group and 4,4'-biphenyl group.

DETAILED DESCRIPTION OF THE INVENTION

The cholesteric liquid crystal polyesters of the present invention will be described in detail hereinunder. Examples of $Ar^1$, $Ar^2$ and $Ar^3$ are

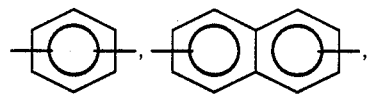

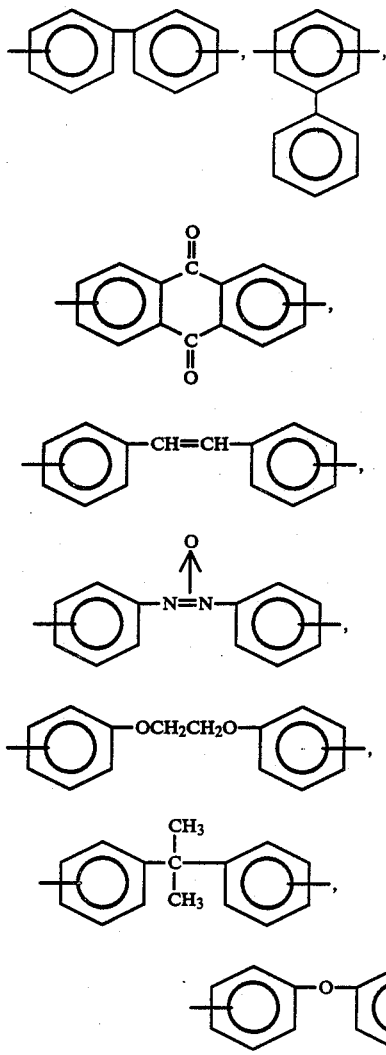

One or more hydrogen atoms of the above examples may be substituted with one or more halogen atoms, alkyl or alkoxy groups having 1 to 4 carbon atoms. In the present invention, however, at least 60 mol % of Ar¹ present in the polymer molecule is constituted by at least one group selected from 1,4-phenylene group, 2,6-naphthyl group and 4,4'-biphenyl group. Preferably, Ar¹ is a divalent aromatic hydrocarbon group

The structure unit (A) is derived from an aromatic hydroxycarboxylic acid or a derivative thereof (e.g. diacetylated compound J and is present in a proportion of preferably 20 to 80 mol %, more preferably 30 to 70 mol %.

Examples of the aromatic hydroxy carboxylic acid are p-hydroxy benzoic acid, 4-hydroxy chlorobenzoic acid, m-hydroxy benzoic acid, 4-hydroxy-3-methyl benzoic acid, 4-hydroxy-3,5-dimethyl benzoic acid, 2-hydroxy-6-naphthoic acid, 1-hydroxy-5-naphthoic acid, 1-hydroxy-4-naphthoic acid, and 4-hydroxy-4'-biphenyl carboxylic acid. They may be used alone or in combination. In order to maintain a melt anisotropy, at least 60 mol %, preferably 70-100 mol %, more preferably all of, of Ar¹ present in the polymer should have linear chain extended linkages selected from 1,4-phenylene group, 2,6-naphthyl group and 4,4'-biphenyl group.

The structural unit (B) is derived from 2-methyl-1,4-butanediol or a derivative thereof (e.g. diacetylated compound) and is present in a proportion of preferably 0.1 to 40 mol %, more preferably 1 to 20 mol %. It is characterized by being optically active.

As the structural unit (B), which is essential for developing cholesteric liquid crystalline mesophase, there may be used either R or S isomer resolved from a racemic mixture. Even a R-S mixture, which exhibits optical activity when either isomer is present in a larger proportion, is also employable. In this case, however, the helical pitch of the cholesteric liquid crystal polymer becomes larger than that of a liquid crystal polymer having the same amount of pure R or S isomer, so that the cholesteric twisting power becomes less efficient. In general, the difference in content between R and S isomers should be not smaller than 15%, preferably not less than 30%.

The structural unit (C) is derived from an aromatic dicarboxylic acid or a derivative thereof (e.g. dialkyl ester such as dimethyl ester) and is present in a proportion of preferably 5 to 50 mol %, more preferably 10 to 40 mol %.

Examples of the aromatic dicarboxylic acid are terephthalic acid, methoxy terephthalic acid, ethoxy terephthalic acid, fluoro terephthalic acid, chloro terephthalic acid, methyl terephthalic acid, isophthalic acid, phthalic acid, methoxy isophthalic acid, diphenylmethane4,4'-dicarboxylic acid,diphenyl methane-3,3'-dicarboxylic acid diphenylether-4,4'-dicarboxylic acid, diphenyl-4,4'-dicarboxylic acid, naphthalene-2,6-dicarboxylic acid, naphthalene-1,5-dicarboxylic acid, naphthalene-1,4-dicarboxylic acid and the like. They may be used alone or in combination.

The structural unit (D) is derived from an aromatic diol or a derivative thereof (e.g. diacetylated compound) and is present in a proportion of 0-50 mol %, preferably 5-50 mol %, more preferably 10-40 mol %. Examples of the aromatic diol are hydroquinone, resolsinol, methyl hydroquinone, chloro hydroquinone, phenyl hydroquinone, 1,4-dihydroxy naphthol, 2,6-dihydroxy naphthol, 2,2'-bis(4-hydroxy phenyl) propane, 4,4'-biphenol and the like. They may be used alone or in combination.

In a cholesteric liquid crystal polymer, a nematic liquid crystal layer is somewhat twisted by an optically active unit, taking a helical structure. A cholesteric liquid crystal polymer in which a rigid straight chain and an optically active monomer are copolymerized in the main chain is expected to afford a film or sheet having a biaxially reinforced structure as if it were a laminated structure.

Thermoplastic cholesteric liquid crystal polyesters of the present invention are characterized by affording shaped articles which are less anisotropic in physical properties while maintaining superior mechanical properties even when they are processed at a high shear rate condition.

As a thermotropic cholesteric liquid crystal polymer is heated up slowly under a polarizing microscope equipped with a hot stage, a crystalline state is transformed into a liquid crystal state at a certain temperature and oily streaks or finger print patterns peculiar to cholesteric liquid crystal polymers are sometimes observed. Further, if such polymers are formed into a film followed by rapid cooling, the cholesteric liquid crystal structure will be maintained in a solid film.

When the pitch length of the cholesteric helix is close to the wavelength of visible light, it will be possible to observe a bright cholesteric color which varies depending on the content of chiral component in the structural unit (C).

The cholesteric liquid crystal polyesters of the present invention can be prepared by a known melt-condensation process. It is desired, however, that 2-methyl-1,4-butanediol or a derivative thereof is reacted with a hydroxy carboxylic acid or the like to prepare an oligo-ester at first since 2-methyl-1,4-butanediol is somewhat volatile and less reactive. For example, 1 mol of 2-methyl-1,4-butanediol is reacted with at least two moles of an aromatic hydroxycarboxylic acid or a derivative thereof providing the structural unit (A) and/or an aromatic dicarboxylic acid or a derivative thereof providing the structural unit (C) to prepare an oligoester and then the resulting oligoester is polycondensated with other monomers.

For the purpose of accelerating polycondensation there may be used known catalysts such as alkali metal salts or metallic salts of Fe, Mn, Cd, Mg, Ba, Ti, Zn, Pb, Co, Sb and Sn, alone or in combination. Moreover, phosphorus compounds may be used as decomposition inhibitors.

The cholesteric liquid crystal polyester thus obtained can be subjected to melt-processing at a temperature not higher than 350° C. to afford a shaped article having superior mechanical properties and yet being less anisotropic in physical properties.

It is possible to increase the molecular weight and accelerate the crystallization and thereby improve the physical properties of a shaped article such as a film by heating it at a temperature of lower than the melting point.

A film may be prepared by applying a solution of the cholesteric liquid crystal polyester of the present invention in a solvent onto a substrate and volatilizing the solvent. In this case, when heating the film at a temperature higher than the melting point of the polymer, polydomains are transformed into a structure close to a Grandjean texture. Thus, the resulting film may be substantially no anisotropic in physical properties while maintaining superior mechanical properties.

The following examples are given to further illustrate the present invention, but it is to be understood that the invention is not limited thereto.

(1) Preparation of Oligomer having Structural Unit (B)

21.0 g of methyl hydroxybenzoate, 7.12 g of (S)-2-methyl-1,4-butanediol and 8 mg of n-butyl orthotitanate were charged into a reactor equipped with a stirrer and reacted at 180–200° C. for 20 hours in a nitrogen gas stream. The reaction mixture was dissolved in ethanol and poured into a large excess of water. As a result, solids were preprecipitated, which were separated by centrifugal separation to obtain crude (S)-2-methyl-1,4-bis[4-hydroxybenzoyloxy]-butane in 38% yield.

The crude product thus obtained was acetylated with acetic anhydride in the presence of a sulfuric acid catalyst, followed by recrystallization from an ethanol solution to give (S)-2-methyl-1,4-bis[4-acetoxybenzoyloxy]-butane (hereinafter referred to simple as "MABB") as white crystals, mp 46° C., in 70% yield. Its structure was identified by $^1$H-NMR.

(2) Preparation of cholesteric Liquid Crystal Polyester 7.67 g (33.3 mmol) of 6-acetoxy-2-naphthoic acid, 10.8 g (60.0 mmol) of acetoxybenzoic acid, 2.32 g (20 mmol) of terephthalic acid, 8.56 g (20 mmol) of the (S)-2-methyl-1,4-bis[4-acetoxybenzoyloxy]butane prepared in the above and 5 mg of potassium acetate were charged into a reactor equipped with a stirrer, and after purging with nitrogen, heating was made from room temperature up to 240° C. at a rate of 2.5° C./min. When the temperature reached 240° C., the introduction of nitrogen was started and heating was made up to 300° C. at a rate of 1° C./min. In the course of this heating step the reaction mixture began to become turbid and was colored to light green, and thus the formation of cholesteric liquid crystal was confirmed. The heating and stirring were continued at 300° C. for 1 hour in a vacuum of 0.5 mmHg to complete the polymerization.

The resulting polymer was dissolved in pentafluorophenol at a concentration of 0.1 wt.% and its inherent viscosity, $\eta$ inh, was measured at 60° C., which was found to be 2.8 dl/g. It was then sandwiched in between two glass plates and observed through a polarizing microscope having a hot stage to find that a sign of melting was shown at 235° C. At 300° C., the glass plates were displaced to exert a shear force on the polymer, resulting in that Grandjean texture was observed and the formation of cholesteric liquid crystal confirmed. The wave length corresponding to a maximum value of cholesteric selective reflection spectrum was 800 nm.

EXAMPLE 2

7.89 g (57.2 mmol) of hydroxybenzoic acid, 3.59 g (19.1 mmol) of 6-hydroxy-2-naphthoic acid, 0.63 g (3.8 mmol) of terephthalic acid and 0.59 g (5.7 mmol) of (S)-2-methyl-1,4-butanediol were charged into a reactor equipped with a stirrer. After purging with nitrogen, heating was made to 230° C. to allow reaction to take place for 30 minutes. Then, 5 mg of potassim acetate and 8.58 g (84.1 mmol) of acetic anhydride were added and reaction was allowed to take place for 2 hours under reflux. Thereafter, heating was made from 150° C. up to 240° C. at a rate of 2.5° C./min while distilling off excess acetic anhydride and acetic acid produced. Once the temperature of 240° C. was reached, heating was made up to 340° C. at a rate of 1° C./min while passing nitrogen. Lastly, heating was continued at 340° C. for 1 hour under a reduced pressure of 0.5 mmHg to compete the polymerization.

The value of inherent viscosity $\eta$ inh measured in the same way as in Example 1 was 3.5 dl/g. The polymer thus prepared was observed through a polarizing microscope having a hot stage to find that a sign of melting was shown at 280° C. At 300° C. the glass plates were displaced to exert a shear force on the polymer; as a result, there was observed Grandjean texture with oily streaks and thus the formation of cholesteric liquid crystal was Comparative Example 1.

6.33 g (27.0 mmol) of 6-acetoxy-2-naphthoic acid, 13.16 g (73.0 mmol) of 4-acetoxybenzoic acid and 5 mg of potassium acetate were charged into a reactor equipped with a stirrer, and after purging with nitrogen, heating was made from room temperature up to 240° C. at a rate of 2.5° C./min. When the temperature reached 240° C., the introduction of nitrogen was started and heating was made up to 340° C. at a rate of 1° C./min. Lastly, heating was continued at 340° C. for 10 minutes under a reduced pressure of 0.5 mmHg to complete the polymerization.

The value of inherent viscosity η inh measured in the same way as in Example 1 was 7.1 dl/g. The polymer thus prepared was observed through a polarizing microscope having a hot stage; as a result, a sign of melting was shown at 280° C. At 300° C. and 320° C., the glass plates were displaced to exert a shear force on the polymer, but Grandjean texture was not observed and the polymer was found to be nematic liquid crystal.

Reaction was conducted in the same manner as in Example 2 except that 6-hydroxy-2-naphthoic acid was not added. In the course of heating from 240° C. at a rate of 1° C./min there occurred solidification at 300° C. or thereabouts and it became impossible to effect stirring. Although heating was continued up to 350° C., there was no sign of melting, so the polymerization was stopped.

An attempt was made to dissolve the polymer in the same solvent as that used in Example 1, but the polymer did not dissolve at all. When the polymer was observed through a polarizing microscope having a hot stage, there occurred no melting at least up to 350° C.

Thus, it is apparent that the use of 6-hydroxy-2-naphthoic acid leads to the formation of a cholesteric liquid crystal capable of being subjected to melt molding even when all the components are aromatic compounds except the optically active monomer.

EXAMPLE 3

7.2 g (40 mmol) of p-acetoxybenzoic acid, 3.32 g (20 mmol) of terephthalic acid, 2.7 g (10 mmol) of diacetoxybiphenyl and 4.28 g (10 mmol) of the (S)-2-methyl-1,4-bis[4-acetoxybenzoyloxy]butane prepared in the foregoing (1) were charged into a reactor equipped with a stirrer. After purging with nitrogen, heating was made at 200° C. for 30 minutes, at 240° C. for 30 minutes and then at 270° C. for 30 minutes, in the nitrogen atmosphere, while distilling off acetic acid produced. Thereafter, while passing nitrogen, reaction was performed at 270° C. for 30 minutes, then heating was made at 270° C. for 2 hours in a reduced pressure and then at 290° C. for 1 hour in a vacuum of 0.1 mmHg to complete the polymerization. In the course of polymerization the reaction mixture began to become turbid and was colored lightly, showing the formation of cholesteric liquid crystal.

The value of η inh measured in the same way as in Example 1 was 1.7 dl/g. The melting point of this polymer as measured according to DSC was 264° C.

The polymer was sandwiched in between two glass plates and heated to 310° C. on a hot stage and Grandjean texture was observed upon application of a shear force, and thus the formation of cholesteric liquid crystal was confirmed. The wavelength corresponding to a maximum value of cholesteric selective reflection spectrum was 750 nm.

The polymer was sandwiched in between polyimide films and placed in a frame fabricated to permit only unidirectional flow, followed by melt pressing at 310° C. to obtain film. Mechanical properties of this film will be tabulated below.

EXAMPLE 4

24.8 g (180 mmol) of hydroxybenzoic acid, 4.98 g (30 mmol) of terephthalic acid, 4.98 g (30 mmol) of isophthalic acid, 8.37 g (45 mmol) of biphenol and 1.56 g (15 mmol) of (S)-2-methyl-1,4-butanediol were charged into a reactor equipped with a stirrer and a reflux condenser, and after purging with nitrogen, heating was made to 220° C. for 1 hour. Then, 2.5 mg of sodium acetate and 33 g (320 mmol) of acetic anhydride were added and reaction was allowed to proceed for 2 hours under reflux. Then, heating was made up to 240° C. while distilling off excess acetic anhydride and acetic acid produced. Upon reaching 240° C., polycondensation was continued in the same manner as in Example 3, and after the reduction of pressure the heating was continued at 270° C. for 2 hours and then at 300° C. for 1 hour in a vacuum of 0.1 mmHg to complete the polymerization. The melting point of the resulting polymer as measured in the same way as in Example 1 was 280° C.

The polymer was observed on a hot stage at 310° C. using a polarizing microscope. When a shear force was exerted thereon, Grandjean texture was observed and the formation of cholesteric liquid crystal confirmed.

Using this polymer, film was formed, whose mechanical properties will be tabulated below.

COMPARATIVE EXAMPLE 2

10.8 g (60 mmol) of p-acetoxybenzoic acid, 1.66 g (10 mmol) of terephthalic acid, 1.6 g (10 mmol) of isophthalic acid and 5.4 g (20 mmol) of diacetoxybiphenyl were poly condensed in the same way as in Example 3, provided the heating conditions after the reduction of pressure were 270° C., 1 hour; 300° C., 30 minutes; and 330° C., 30 minutes.

The melting point of this polymer as measured in the same manner as in Example 3 was 309° C.

Then, the polymer was observed on a hot stage at 360° C. using a polarizing microscope; as a result, the polymer exhibited optical anisotropy and was confirmed to be in a state of liquid crystal, but Grandjean texture was not observed.

Using the polymer, film was formed, whose mechanical properties are as shown in Table below.

TABLE 1

| | Mechanical Properties of Film | | | |
|---|---|---|---|---|
| | Modulus (GPa) | | Strength (MPa) | |
| Film thickness (μm) | Flow direction | Perpendicular direction to the flow | Flow direction | Perpendicular direction to the flow |
| Example 3 | 40 | 8.2 | 7.9 | 110 | 110 |
| Example 4 | 50 | 8.0 | 7.5 | 130 | 120 |
| Comparative Example 3 | 50 | 3.7 | 1.7 | 160 | 32 |

As shown in the above Examples, the polyesters according to the present invention exhibit cholesteric liquid crystallinity, and the films formed by melt pressing were very low in anisotropy of their physical properties while maintaining high mechanical characteristics reflecting the structure of cholesteric liquid crystal.

What is claimed is:

1. A cholesteric liquid crystal polyester comprising the following structural units (A), (B) and (C):

-continued

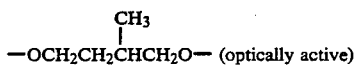 (B)

$$-OCH_2CH_2\overset{CH_3}{\underset{|}{C}}HCH_2O- \text{ (optically active)}$$

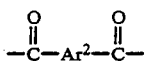 (C)

$$-\overset{O}{\underset{\|}{C}}-Ar^2-\overset{O}{\underset{\|}{C}}-$$

wherein Ar¹ and Ar² represent each independently a divalent aromatic hydrocarbon group having 6 to 20 carbon atoms, the aromatic group is unsubstituted or substituted by one or more substituents, selected from a member of the group of halogen atoms, alkyl or alkoxy groups, wherein the alkyl groups has from 1 to 4 carbon atoms, provided that at least 60 mol % of Ar¹ in the polymer is constituted by at least one group selected from 1,4-phenyl group, 2,6-naphthyl group or 4,4'-biphenyl group.

2. A cholesteric liquid crystal polyester of claim 1 further comprising the following structural unit (D):

$$-O-Ar^3-O- \text{ wherein}$$

wherein Ar³ represent a divalent aromatic hydrocarbon group having 6 to 20 carbon atoms, of which one or more hydrogen atoms are substituted by one or more halogen atoms, alkyl or alkoxy groups having 1 to 4 carbon atoms.

3. A cholesteric liquid crystal polyester of claim 1 or 2, containing the structural units (A), (B), (C) and (D) in proportions of 20-80 mol %, 0.1-40 mol %, 5-50 mol % and 0-50 mol %, respectively, based on the total 100 mol % of said (A)-(D).

4. A cholesteric liquid crystal polyester of claim 2 or 3, in which the structural unit (D) is contained in proportion of 5-50 mol % based on the total 100 mol % of said (A) to (D).

5. A cholesteric liquid crystal polyester of claim 1, in which Ar¹, Ar² and Ar³ represent each independently

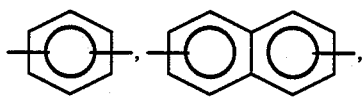

-continued

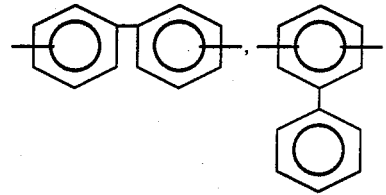

6. A cholesteric liquid crystal polyester of claim 1, in which Ar¹ is

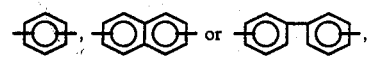

7. A cholesteric liquid crystal polyester of claim 1, in which substantially all of said Ar¹ in the polymer is constituted by one or more groups selected from 1,4-phenylene group, 2,6-naphthyl group or 4,4'-biphenyl group.

8. A cholesteric liquid crystal polyester of claim 1, in which the structural unit (A) is a combination of 2-hydroxy-6-naphthoic acid unit and p-hydroxybenzoic acid unit.

* * * * *